United States Patent
Conrardy et al.

(10) Patent No.: US 9,422,889 B2
(45) Date of Patent: Aug. 23, 2016

(54) COMBINED TURBOJET AND RAMJET ENGINE

(75) Inventors: Jean-Marie Conrardy, Courcelles sur Seine (FR); Nicolas Soulier, Fontaine Bellenger (FR)

(73) Assignee: SNECMA, Paris (FR)

(*) Notice: Subject to any disclaimer, the term of this patent is extended or adjusted under 35 U.S.C. 154(b) by 618 days.

(21) Appl. No.: 13/989,070

(22) PCT Filed: Nov. 14, 2011

(86) PCT No.: PCT/FR2011/052630
§ 371 (c)(1),
(2), (4) Date: Aug. 1, 2013

(87) PCT Pub. No.: WO2012/069729
PCT Pub. Date: May 31, 2012

(65) Prior Publication Data
US 2013/0305686 A1      Nov. 21, 2013

(30) Foreign Application Priority Data

Nov. 23, 2010  (FR) ...................................... 10 59630

(51) Int. Cl.
*F02K 7/16* (2006.01)
*F02K 3/00* (2006.01)
(Continued)

(52) U.S. Cl.
CPC ... *F02K 7/16* (2013.01); *F02K 3/00* (2013.01); *F02C 7/224* (2013.01); *F02K 3/072* (2013.01); *Y02T 50/672* (2013.01)

(58) Field of Classification Search
CPC ............. F02K 3/00; F02K 7/16; F02K 3/072; F02C 7/224
See application file for complete search history.

(56) References Cited

U.S. PATENT DOCUMENTS

| | | | | |
|---|---|---|---|---|
| 3,172,253 A | * | 3/1965 | Hughes | F02K 1/165 137/15.1 |
| 3,237,400 A | * | 3/1966 | Kuhrt | F02C 1/007 60/246 |

(Continued)

FOREIGN PATENT DOCUMENTS

| | | |
|---|---|---|
| CN | 2620100 Y | 6/2004 |
| CN | 101160502 A | 4/2008 |

(Continued)

OTHER PUBLICATIONS

Dorf, Richard, "The Engineering Handbook", CRC Press, 1996, pp. 991-996.*

(Continued)

*Primary Examiner* — Lorne Meade
(74) *Attorney, Agent, or Firm* — Oblon, McClelland, Maier & Neustadt, L.L.P

(57) ABSTRACT

A combined engine includes a turbopump including a pump injecting hydrogen into a heater arranged in an outer casing downstream from a central body, and a subsonic turbine driving the pump, which turbine receives partially-expanded hydrogen collected at an outlet from the heater to apply the hydrogen to a supersonic turbine to operate the engine as a turbojet. The hydrogen from the supersonic turbine is collected in tubes inside the central body to be sent to a combustion chamber defined downstream from the central body, while the hydrogen that is partially expanded in the subsonic turbine is sent directly to the combustion chamber via injectors to operate the engine as a ramjet.

5 Claims, 4 Drawing Sheets

(51) Int. Cl.
*F02K 3/072* (2006.01)
*F02C 7/224* (2006.01)

(56) References Cited

U.S. PATENT DOCUMENTS

| | | | | |
|---|---|---|---|---|
| 3,237,401 | A * | 3/1966 | Peters | F02K 3/00 60/246 |
| 3,797,239 | A * | 3/1974 | Hausmann | F02K 9/78 60/224 |
| 3,956,887 | A | 5/1976 | MacDonald | |
| 4,185,457 | A * | 1/1980 | Parker | F02K 7/16 60/204 |
| 4,543,785 | A | 10/1985 | Patrick | |
| 4,765,135 | A * | 8/1988 | Lardellier | F01D 5/03 416/127 |
| 5,014,508 | A | 5/1991 | Lifka | |
| 5,052,176 | A * | 10/1991 | Labatut | F02K 3/10 60/225 |
| 5,094,071 | A * | 3/1992 | Jabs | F02K 7/16 137/15.1 |
| 5,119,626 | A * | 6/1992 | Lardellier | F02C 3/067 60/244 |
| 5,284,014 | A * | 2/1994 | Brossier | F02K 7/16 60/225 |
| 7,370,469 | B2 * | 5/2008 | Watkins | F02K 9/64 165/154 |
| 2006/0237166 | A1 | 10/2006 | Otey et al. | |

FOREIGN PATENT DOCUMENTS

| | | |
|---|---|---|
| EP | 0 362 054 | 4/1990 |
| EP | 0 388 613 | 9/1990 |
| EP | 0 403 372 | 12/1990 |
| JP | 11107857 | 4/1999 |

OTHER PUBLICATIONS

International Search Report Issued Jan. 18, 2012 in PCT/FR11/52630 Filed Nov. 14, 2011.
Combined Office Action and Search Report issued Jan. 27, 2015 in Chinese Patent Application No. 201180056380.5 (with English language translation and English translation of Category of Cited Documents).

* cited by examiner

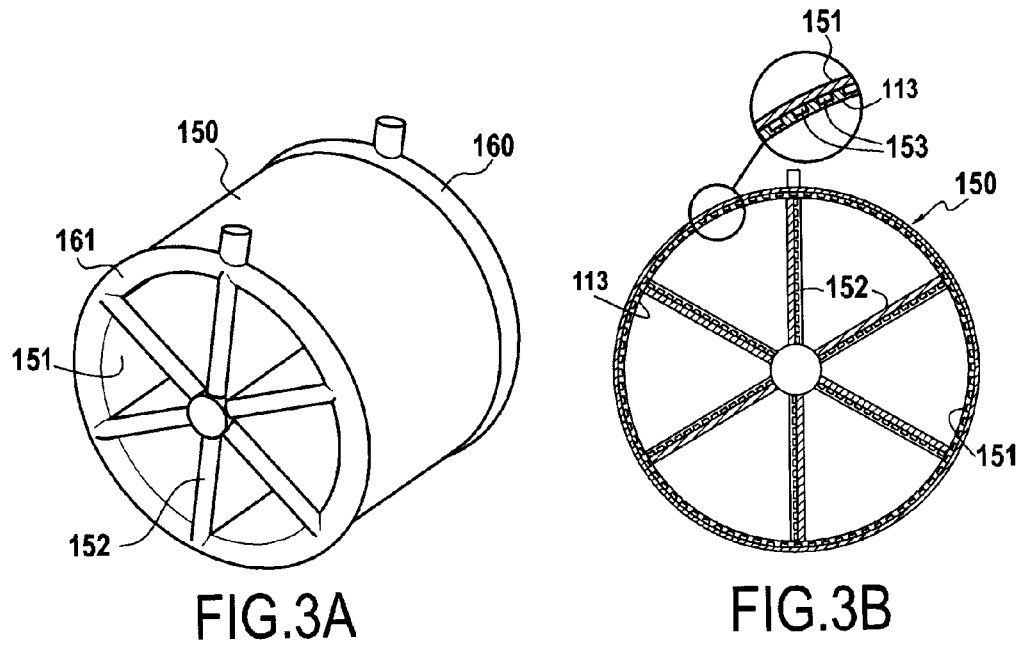
FIG.3A
FIG.3B
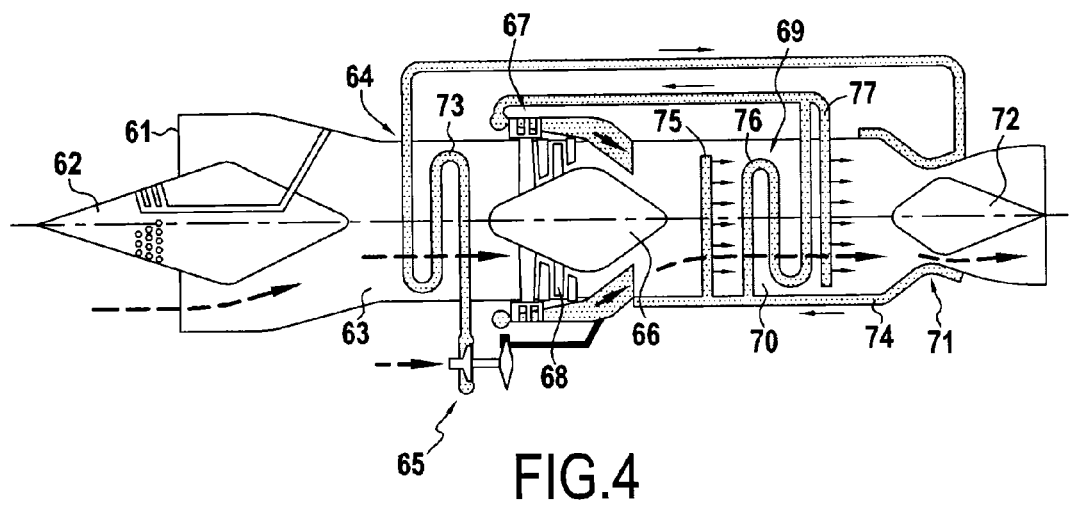
FIG.4
PRIOR ART

COMBINED TURBOJET AND RAMJET ENGINE

The present invention relates to a combined turbojet and ramjet engine comprising an outer casing, a central body connected to said outer casing by structural arms and co-operating therewith to form an air inlet sleeve and an air flow passage, and at least one first air compressor stage comprising a first turbine arranged in said central body and a first rotor having blades arranged in said air flow passage and capable selectively of being driven by said first turbine to operate the engine as a turbojet and of being feathered to operate the engine as a ramjet.

Document EP 0 403 372 B1 already discloses a combined turborocket and ramjet engine with post combustion of the type shown in FIGS. 5 and 6.

Such a prior art combined engine comprises a two-dimensional air inlet sleeve 1 of varying section followed by a shape-transition section 2 that provides a junction with an annular passage 3 formed between an outer casing 4 and a bullet-shaped central body 5 that is connected to the outer casing 4 by structural arms 7 arranged transversely relative to the annular passage 3. Downstream from the arms 7, level with the conical rear portion 6 of the central body 5, there is defined a combustion zone 10 in which fuel injectors 11 are arranged in order to operate the engine as a ramjet, followed by a post-combustion system 12 including flame-holder rings carried by the downstream cone 6.

The combustion zone 10 is followed by a nozzle 13 with a casing structure that includes a heat exchanger 14 suitable for delivering energy to the liquid fuel before it is used and for cooling the wall of the nozzle, which heat exchanger is followed by a converging-diverging ejection nozzle 15 of variable section.

In FIG. 5, there can be seen a diagrammatic view of a gas generator 19 fed from downstream with liquid propellant in order to generate combustion gases at an upstream end in a stationary central ejection chamber 20 leading to an annular upstream chamber 21 in which the gas from the rocket engine is forced towards a subsonic power turbine made up of two interleaved contrarotating modules 22 and 23 that are connected respectively to an upstream module 8 and to a downstream module 9 of the compressor.

After driving the turbines 22 and 23, the gas from the generator 19 is ejected into the compressed air passage in the combustion zone 10 via longitudinal channels 24 that pass through the wall of the central body 5.

The gas generator 19 is fed via a pipe 25 with oxygen pumped by a turbopump 26 from a tank 27, and via a pipe 32 with hydrogen pumped by a turbopump 29 from a tank 28. The hydrogen pumped by the turbopump 29 serves initially via a first branch 30 to feed the heat exchanger 14 where the hydrogen passes into gaseous form prior to being fed to the gas generator 19 by the pipe 32 for turborocket operation, or to the injectors 11 via a pipe 33 for ramjet operation. A 3-port L-valve 31 is situated at the outlet from the heat exchanger 14 and at the inlets of the pipes 32 and 33.

The hydrogen pumped by the turbopump 29 also acts via a second branch 34 and a 3-port T-valve 35 to feed two cooling circuits 36 and 37 for cooling the blades of the rotors of the upstream and downstream modules 8 and 9 of the compressor. Heat exchangers 53 and 54 are arranged in the cooling circuits 36 and 37 to ensure initial heating of the liquid hydrogen.

Thus, in that type of prior art combined engine, for the turbojet cycle, a hydrogen and oxygen powered gas generator cycle is used, with the gas from the generator serving to feed a subsonic contrarotating turbine that drives the two stages of the compressor. For ramjet operation above a certain speed, the gas generator is stopped, the blades of the upstream and downstream compressor modules are feathered, and only post combustion operates.

The use of a gas generator cycle requires liquid oxygen to be available on board for the turbojet stage of operation. This presents a drawback since it involves particular safety measures and increases on-board weight. The turbines used that are driven by the hot gas from the gas generator are of the subsonic type and do not present optimized operation. Furthermore, the rotor blades of the compressor are cooled at high Mach number by sweating hydrogen that is ejected from the blades into the compression portion and can thus lead to degraded combustion.

An air turboramjet expander cycle (ATREX) engine is also known that has been developed by the Japanese JAXA Agency, but its development has been abandoned.

The operating principle of that type of turboramjet is shown in FIG. 4. The turbopump 65 of the hydrogen feed circuit and the turbine 67 of the turbine engine are driven by the expansion of liquid hydrogen.

The turbine 67 of that engine is arranged at the periphery of the grid 68 of compressor blades revolving in non-contrarotating manner around a bullet-shaped central body 66. The turbine 67 is fed with hydrogen heated by upstream and downstream heat exchangers 64 and 69. The turbine 67 drives the grid of compressor blades 68, thereby compressing the air introduced via an inlet section 61 into the air passage 63 and cooled by the upstream heat exchanger 64, which constitutes a pre-cooler situated upstream from the turbine 67.

Combustion is of the post-combustion type and as well as generating thrust, it delivers energy for driving the turbine 67 via the downstream heat exchanger 69. The turbine 67 is of the supersonic type. The feed pressure for the turbine 67 is obtained by the turbopump 65 having a cold turbine that is fed with regenerated hydrogen.

In FIG. 4, there can be seen a bullet-shaped body 62 defining an annular air inlet 61 of varying section, the pre-cooler 64, the bullet-shaped central body 66 around which the turbine 67 and the grid 68 of compressor blades rotate, a combustion chamber 70 with a first injection device 75, the downstream heat exchanger 69, and a second injection device 77. A converging-diverging nozzle 71 with a bullet-shaped central body 72 serves to eject gas downstream from the combustion chamber 70. The liquid hydrogen pumped by the turbopump 65 and coming from a tank that is not shown flows firstly in a segment 73 forming part of the pre-cooler 64, and then flows in a segment 74 of the wall of the converging-diverging nozzle 71 in order to cool said wall and in order to continue to be heated, prior to being applied to the first injection device 75 and to the circuit 76 of the downstream heat exchanger 69 that leads into the second injection device 77. The downstream heat exchanger 69 can be incorporated in a carbon-carbon matrix.

The cold turbine of the turbopump 65 receives the hydrogen that has been heated in the pre-cooler 64 and in the wall of the downstream nozzle, but that has not passed through the downstream heat exchanger 69. In contrast, the turbine 67 is fed with hydrogen that has also been heated in the downstream heat exchanger 69.

The use of a heat exchanger or pre-cooler 64 at the air inlet enables the compressor to be cooled, but causes ice to be formed as a result of liquid hydrogen being regenerated using ambient air. In addition, the fact that the downstream heat exchanger 69 is incorporated in a carbon-carbon structure makes it impossible to optimize its performance. Finally, the concept of a so-called "tip" turbine 67 arranged outside the grid 68 of compressor blades leads to blades that are very short and to high mechanical stresses as a result of the high peripheral speed.

An object of the present invention is to remedy the above-mentioned drawbacks of prior art combined engines, and in particular to avoid using liquid oxygen, while also making it possible to obtain an embodiment that is compact, with structure that is simplified, weight that is reduced, and performance that is improved.

In accordance with the invention, these objects are achieved by means of a combined turbojet and ramjet engine comprising an outer casing, a central body connected to said outer casing by structural arms and co-operating therewith to form an air inlet sleeve and an air flow passage, and at least one first air compressor stage comprising a first turbine arranged in said central body and a first rotor having blades arranged in said air flow passage and capable selectively of being driven by said first turbine to operate the engine as a turbojet and of being feathered to operate the engine as a ramjet; the engine being characterized in that it further comprises a turbopump comprising a pump that is fed with liquid hydrogen from a hydrogen tank in order to inject the hydrogen into a heater arranged in said outer casing downstream from said central body and a subsonic turbine driving said pump, the turbine receiving the partially-expanded hydrogen collected at the outlet from the heater, the hydrogen that is partially expanded in the subsonic turbine being applied to said first turbine, which is a supersonic turbine, in order to operate the engine as a turbojet, the hydrogen from the first supersonic turbine then being collected in first tubes inside said central body to be sent to the combustion chamber defined inside the casing downstream from said central body, while the hydrogen that is partially expanded in the subsonic turbine is sent directly into said combustion chamber by injectors in order to operate the engine as a ramjet.

Advantageously, the combined engine further comprises means for taking a fraction of the hydrogen from the first supersonic turbine, means for introducing this hydrogen fraction into first internal channels formed inside the blades of the first rotor, and means for exhausting this hydrogen fraction to said combustion chamber via said first tubes after passing along said first internal channels.

In a particular embodiment, the combined engine further comprises a second air compressor stage comprising a second supersonic turbine arranged in said central body and a second rotor having contrarotating blades arranged in said air flow passage and capable selectively of being driven by said second turbine in order to operate the engine as a turbojet and of being feathered in order to operate the engine as a ramjet, said second turbine also receiving the hydrogen that has been partially expanded in the subsonic turbine, and the hydrogen from the second supersonic turbine then being collected in second tubes inside said central body in order to be sent to said combustion chamber in order to operate the engine as a turbojet.

Under such circumstances, according to an advantageous aspect of the invention, the combined engine may further comprise means for taking a fraction of the hydrogen coming from the second supersonic turbine, means for introducing this hydrogen fraction into second internal channels formed inside the blades of the second rotor, and means for exhausting this hydrogen fraction to said combustion chamber via said second tubes after passing through said second internal channel.

The combined engine includes a post-combustion device with flame-holder rings arranged in said combustion chamber between a rear portion of the central body and a portion of the outer casing containing said heater.

The heater may include a heat exchanger having regenerating walls and fins.

By way of example, the heater may comprise a heat exchanger having walls with milled channels made of a material based on copper or on high-temperature nickel.

Other characteristics and advantages of the invention appear from the following description of particular embodiments given as examples and with reference to the accompanying drawings, in which:

FIG. 3A is a perspective view of a segment of a heat exchanger usable in the context of the present invention;

FIG. 3B is a section view on line IIIB-IIIB of FIG. 1 showing the FIG. 3A heat exchanger segment;

FIG. 4 is a diagrammatic axial section view of a prior art expander cycle turboramjet of the ATREX type;

Figure 1:
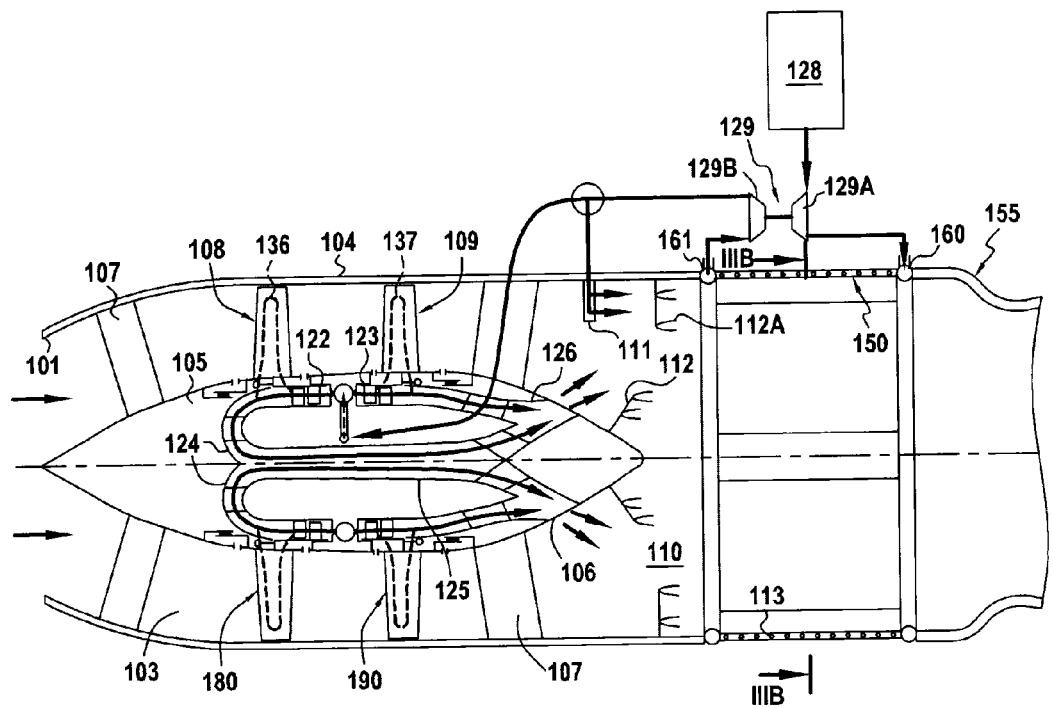
FIG. 1 is a diagrammatic axial section view of a first embodiment of a combined engine of the invention having an expander cycle and with two supersonic turbines for feeding two contrarotating compressor rotors.

With reference to FIG. 1, there can be seen an embodiment of an expander cycle combined turbojet and ramjet engine of the invention.

The combined engine comprises an outer casing 104 having arranged therein a central body 105 that is essentially bullet-shaped and that is connected to the outer casing 104 by transverse structural arms 107 that are regularly distributed around the central body 105. FIG. 1 shows a first series of arms 107 for supporting the upstream portion of the central body 105 and a second series of arms 107 for supporting the downstream portion 106 of the central body 105 so as to distribute the forces better. Nevertheless, it would equally be possible to have a single series of structural arms 107 supporting the central portion of the central body 105.

An annular air passage 103 is formed between the central body 105 and the outer casing 107. An air inlet sleeve 101 enables ambient outside air to be introduced into the air passage 103.

First and second air compressor stages with first and second rotors 108 and 109 having contrarotating blades 180 and 190 are arranged in the air flow passage 103 between the first and second series of structural arms 107 located respectively on the upstream portion and on the downstream portion 106 of the central body 105.

In a turbojet stage of operation, the first and second rotors 108 and 109 are driven in rotation in opposite directions about the central body 105 with the help of first and second supersonic turbines 122 and 123 located in the hubs of the grids of compressor blades constituting the first and second rotors 108 and 109.

During a ramjet stage of operation, the blades 180 and 190 of the rotors 108 and 109 are feathered.

A turbopump 129 comprises a pump 129A that is fed with liquid hydrogen from a hydrogen tank 128 in order to inject hydrogen into a heater 150 arranged inside the outer casing 104 downstream from the central body 105. The turbopump 129 also has a subsonic turbine 129B that is used for driving the pump 129A and that receives partially-expanded hydrogen taken from the outlet of the heater 150.

During a ramjet stage of operation, the hydrogen that has been partially expanded in the subsonic turbine 129B is applied to the supersonic turbines 122 and 123 after following a path that runs inside at least one of the downstream structural arms 107 in order to penetrate into the central body 105 and feed an annular hydrogen injection tube at the inlet of each of the supersonic turbines 122 and 123.

The hydrogen from the supersonic turbine 122 situated upstream is collected in a tube 124 that takes the stream of hydrogen along the axis of the engine and then delivers it via a central longitudinal tube 125 towards the downstream portion 106 of the central body so that it is exhausted via an annular outlet into the combustion chamber 110 defined inside the casing 104 downstream from the central body 105.

A 3-port T-valve 131 is arranged on the hydrogen path between the outlet from the subsonic turbine 129B and the inlet inside the outer casing 104 so as to make it possible during ramjet operation of the engine to send the hydrogen that has been partially expanded in the subsonic turbine 129B directly into the combustion chamber 110 via injectors 111 that are arranged in the vicinity of the downstream end 106 of the central body 105.

Flame-holder rings 112 and 112A are arranged in the combustion chamber 110 between the downstream portion 106 of the central body 105 and the portion 113 of the casing 104 that contains the heater 150. These rings may be fastened to the wall of the casing 104 (rings 112A) or to the downstream portion 106 of the central body 105 (rings 112).

The hydrogen from the supersonic turbine 123 situated downstream is collected by tubes 126 that extend essentially longitudinally towards the downstream end of the central body 105 and that lead to the combustion chamber 110 via an annular outlet that may optionally coincide with the annular outlet from the tubes that receive the hydrogen that has passed through the central longitudinal tube 125 after passing through the upstream supersonic turbine 122.

In summary, when the combined engine of FIG. 1 operates as a turbojet with an expander cycle, hydrogen is fed in series through the subsonic turbine 129B associated with the hydrogen feed pump 129A and through the supersonic turbines 122 and 123 associated with the two stages of rotors 108 and 109 with contrarotating blades.

More particularly, at the outlet from the hydrogen pump 129A, hydrogen is injected into a heater 150 positioned in the wall 113 of the outer casing 104, after the combustion chamber 110.

The hydrogen collected at the outlet from the heater 150 is partially expanded in the subsonic turbine 129B that is used for driving the pump 129A.

The hydrogen from the subsonic turbine 129B is transferred to the supersonic turbines 122 and 123 where it is expanded to drive the contrarotating bladed rotors 108 and 109, each of the turbines 122 and 123 being associated with a respective rotor stage 108 or 109.

The hydrogen from the supersonic turbines 122 and 123 is then collected in the tubes 124, 125, and 126 in order to be sent into the combustion chambers 110.

In this context, it should be observed that the combined hypersonic engine of the invention uses only liquid hydrogen as fuel and that there is thus no need to carry a liquid oxygen (LOX) tank nor is there any need to provide a LOX pump.

No heat exchanger is positioned in the central body 105 upstream from the combustion chamber 110, so there is no risk of the air inlet icing. The heater 150 is the only heat exchanger and it is located in the post-combustion zone, immediately downstream from the combustion chamber proper 110.

All of the energy needed for operation of the engine is obtained by regenerating hydrogen.

The supersonic turbines 122 and 123 are subjected to very little temperature stress and they do not need cooling. Only the blades 180 and 190 of the rotors 108 and 109 of the compressor need to be cooled by hydrogen flowing through channels represented by dashed lines 136 and 137 in FIG. 1, and the hydrogen that has traveled within the blades 180 and 190 is then returned to the tubes 124, 125, or 126 so as to be subsequently discharged at the downstream portion 106 of the central body 105 into the combustion or post-combustion zone 110.

It should be observed that the engine is very simple to start. No special starter is required and starting is performed on the basis of the inertia of the heat exchanger 150.

The engine of the invention enables very high performance to be achieved, with operation that most preferably can go up to about Mach 5.

The specific impulse ISP may thus be about 4000 seconds (s) for example as compared with 3000 s for a conventional jet engine burning kerosene. It is even possible, by way of example, to obtain an ISP of about 7000 s with a turbojet burning hydrogen at Mach 0.8.

In ramjet operation, the cycle of the FIG. 1 combined engine is as follows:

The blades 180 and 190 of the compressor grids 108 and 109 are feathered.

At the outlet from the hydrogen pump 129A, hydrogen is injected into the heater 150 located after the combustion chamber 110, and then the hydrogen is collected at the outlet from the heater 150 in order to be expanded in part in the subsonic turbine 129B driving the pump 129A (as in the turbojet position).

Thereafter, the 3-port T-valve 131 changes position from turbojet operation so that the hydrogen collected at the outlet from the subsonic turbine 129B is sent to the injectors 111 in order to be injected directly into the combustion chamber 110 without passing via the supersonic turbines 122 and 123 that are then bypassed. Nearly all of the hydrogen is thus sent into the combustion chamber 110. Nevertheless, a small amount of hydrogen can still be taken from the 3-port T-valve 131 so as to continue to feed the cooling circuits of the blades 180 and 190 (flow paths 136 and 137 in FIG. 1), with this small quantity of hydrogen then being sent to the combustion chamber 110 via the tubes 124, 125, and 126, as stated above.

The embodiment of FIG. 1 with two low-speed supersonic turbines 122 and 123 having partial injection for driving the bladed compressor serves to obtain a high expansion ratio with a small number of stages 108 and 109, and with the supersonic turbines 122 and 123 being positioned in the central hubs of the compressor grids, so the combined engine presents both low weight and simplified structure.

Figure 2:
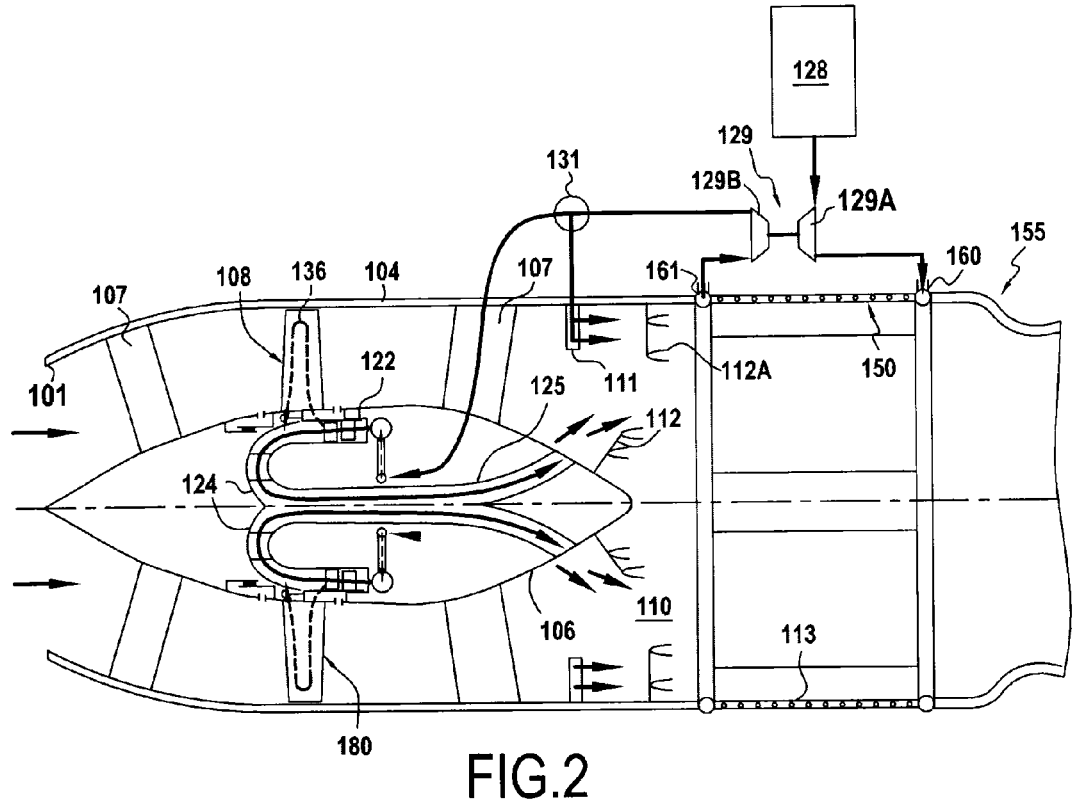
FIG. 2 is a diagrammatic axial section view of a second embodiment of a combined engine of the invention having an expander cycle and with a single supersonic turbine for feeding a compressor rotor.
Figure 5:
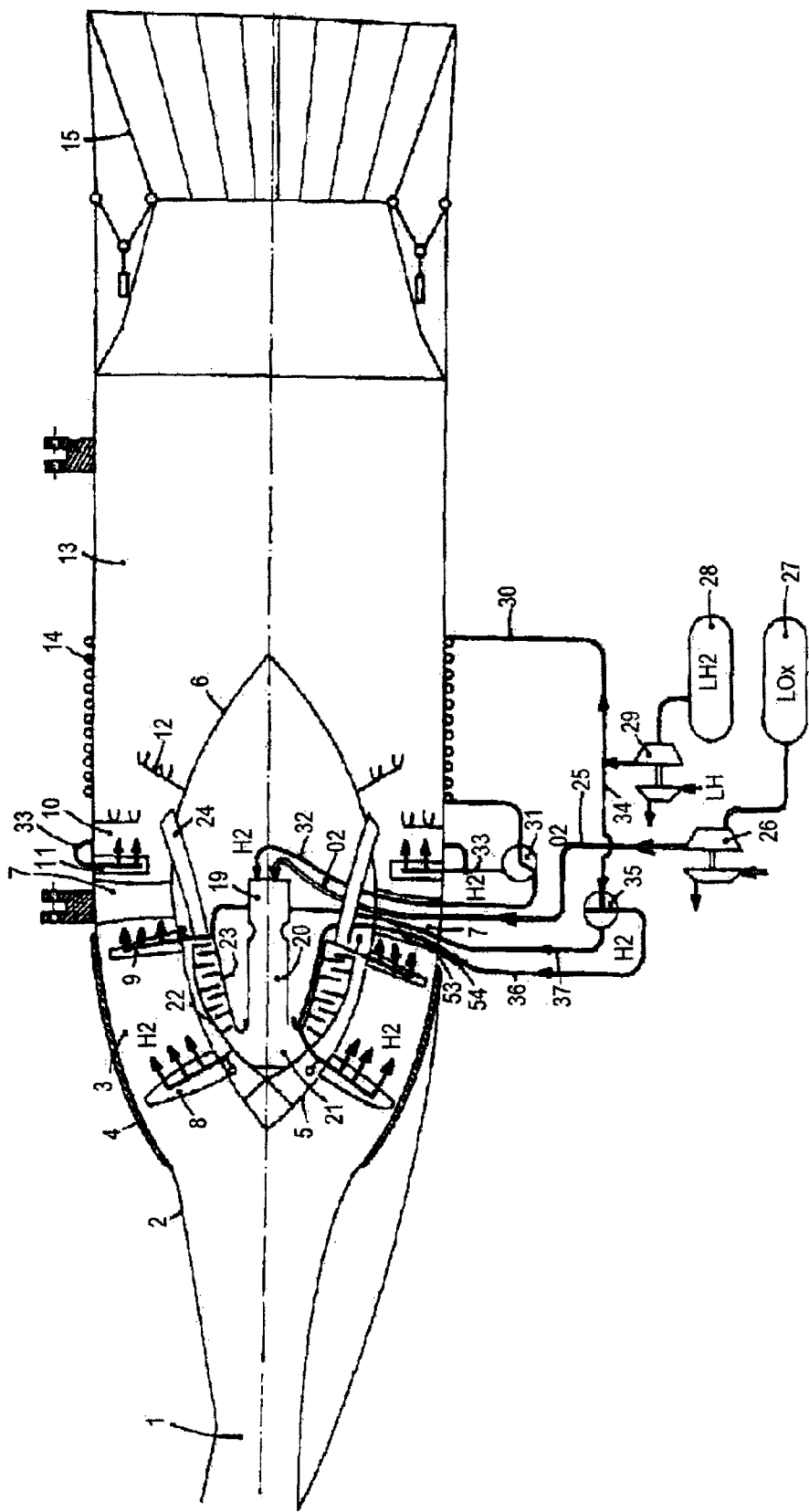
FIG. 5 is a diagrammatic axial section view of a prior art combined turborocket and ramjet engine.
Figure 6:
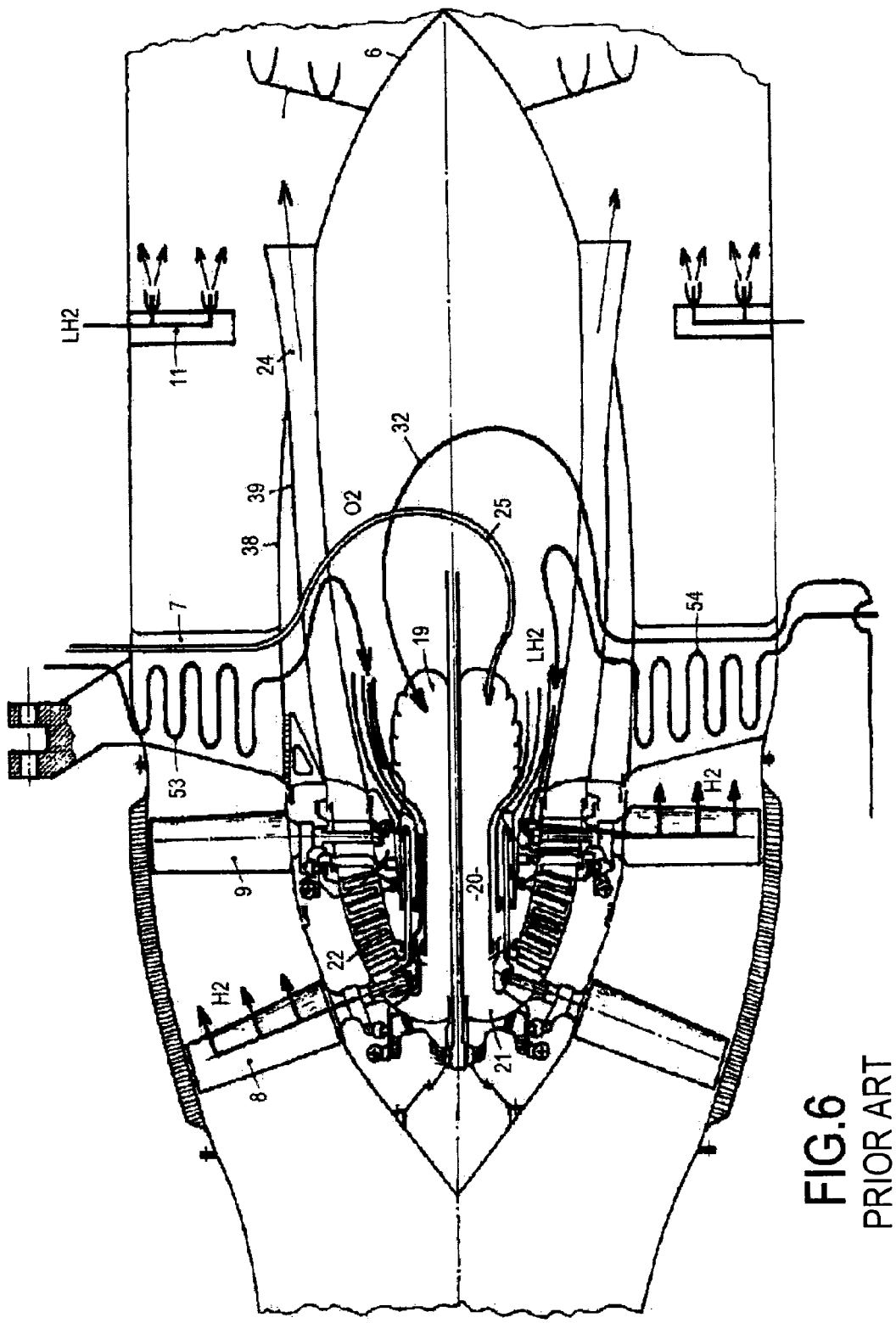
FIG. 6 is an axial section view of a particular embodiment of the prior art combined turborocket and ramjet engine of FIG. 5.

FIG. 2 shows another possible embodiment of a combined engine of the invention that provides thrust performance that is not quite as good as that of the FIG. 1 embodiment, but that presents a structure that is simpler.

In the embodiment of FIG. 2, the air compressor has a single stage 108 of grids having blades 180, so only one supersonic turbine 122 needs to be provided.

The structure and the operation of the combined engine of FIG. 2 are analogous to those of FIG. 1, both in turbojet mode and in ramjet mode, and elements that they have in common are given the same reference numbers and are not described again. The only difference lies in omitting one of the compressor rotors and the associated supersonic turbine.

FIG. 2 shows a supersonic turbine 122 for which hydrogen injection is performed from its downstream end, i.e. the single supersonic turbine corresponds to the upstream supersonic turbine 122 of FIG. 1 and the compressor rotor 108 likewise corresponds to the upstream stage 108 of the compressor in the embodiment of FIG. 1.

As a variant, it is nevertheless possible to use a single supersonic turbine that is constituted by the downstream supersonic turbine 123 of FIG. 1, with hydrogen being injected into its upstream end. Such a variant embodiment would thus have the downstream supersonic turbine 123 of FIG. 1 and the compressor grid stage 109, together with the hydrogen exhaust tubes 126, while the upstream supersonic turbine 122, the compressor grid stage 108, and the hydrogen exhaust tubes 124 and 125 would be omitted.

FIGS. 3A and 3B show a particular embodiment of the heat exchanger 150 arranged in the wall 113 of the casing 104 downstream from the combustion chamber 110. FIGS. 3A and 3B show a heat exchanger segment 150 comprising a regenerating inner cylindrical wall 151 and also regenerating fins 152 that extend radially along the entire length of the heat exchanger.

The heat exchanger may thus be made using techniques similar to those used for making the walls of rocket engine diverging portions, e.g. by using milled channels 153 and materials based on copper, on high-temperature nickel, or indeed based on iron, both for the cylindrical wall 150 and for the fins 152.

By way of example, FIGS. 1 and 2 show the particular heat exchanger 150 of FIGS. 3A and 3B incorporated in the wall 113 of the post-combustion chamber situated downstream from the combustion chamber 110, but other forms of heat exchanger are naturally possible.

As can be seen in FIGS. 3A and 3B, the heat exchanger 150 is constituted by a regenerating cylindrical portion 151 and by a plurality of regenerating fins 152. The inside skin of the cylindrical portion 151 constitutes the wall 113 of the post-combustion chamber. The longitudinal channels 153 formed in the regenerating walls 151 and 152 are connected at opposite ends in the axial direction firstly to an inlet manifold 160 and secondly to an outlet manifold 161.

The outlet manifold 161 is mechanically connected to the casing 104 downstream from the combustion chamber 110, while the inlet manifold 160 is mechanically connected to a converging-diverging exhaust nozzle 155 that constitutes the downstream portion of the combined engine (see FIGS. 1 and 2).

The invention claimed is:

1. A combined turbojet and ramjet engine configured to avoid using liquid oxygen, comprising:
    an outer casing having an upstream air inlet and a downstream exhaust nozzle where a downstream direction is defined by an air flow from the upstream air inlet to the downstream exhaust nozzle;
    a central body connected to the outer casing by structural arms and co-operating with the outer casing to form an air inlet sleeve and an air flow passage;
    at least one first air compressor stage comprising a first supersonic turbine arranged in the central body and a first rotor comprising blades arranged in the air flow passage, the first rotor being driven by the first supersonic turbine to operate the engine in a turbojet mode and the blades of the first rotor being feathered to operate the engine in a ramjet mode, the first supersonic turbine rotating around a longitudinal axis of the central body;
    an annular hydrogen injection tube connected to an inlet of the first supersonic turbine, the annular hydrogen injection tube located inside the central body and downstream of the first supersonic turbine;
    a first collection tubes connected to an outlet of the first supersonic turbine, the first collection tubes located upstream of the first supersonic turbine;
    a turbopump comprising a pump that is fed with liquid hydrogen from a hydrogen tank to inject the liquid hydrogen into a heater arranged in the outer casing downstream from the central body and a subsonic turbine driving the pump, the subsonic turbine receiving a partially-expanded hydrogen collected at an outlet from the heater; and
    a 3-port T-valve arranged at an outlet of the subsonic turbine to, in a first position, supply a hydrogen that is further expanded in the subsonic turbine to the annular hydrogen injection tube and then to the first supersonic turbine to operate the engine in the turbojet mode, the hydrogen from the outlet of the first supersonic turbine then being collected in the first collection tubes inside the central body to be sent to a combustion chamber defined inside the outer casing downstream from the central body, in a second position, the 3-port T-valve switches the hydrogen that is further partially expanded in the subsonic turbine directly into the combustion chamber by injectors to operate the engine in the ramjet mode.

2. A combined engine according to claim 1, further comprising
    a second air compressor stage comprising a second supersonic turbine arranged in the central body and a second rotor comprising contrarotating blades arranged in the air flow passage and configured to be selectively driven by the second supersonic turbine to operate the engine in the turbojet mode, said contrarotating blades being feathered to operate the engine in the ramjet mode, the second supersonic turbine also receiving the hydrogen that has been further expanded in the subsonic turbine from the annular hydrogen injection tube which is located upstream of the second supersonic turbine, the hydrogen from an outlet of the second supersonic turbine then being collected in second tubes located inside the central body and downstream of the second supersonic turbine to be sent to the combustion chamber to operate the engine in the turbojet mode.

3. A combined engine according to claim 1, further comprising a post-combustion device comprising flame-holder rings arranged in the combustion chamber between a rear portion of the central body and a portion of the outer casing containing the heater.

4. A combined engine according to claim 1, wherein the heater comprises a heat exchanger comprising regenerating walls and regenerating fins.

5. A combined engine according to claim 4, wherein the heater comprises a heat exchanger comprising walls with milled channels made of a material based on copper or on high-temperature nickel.

* * * * *